(No Model.)
A. DELL.
ATTACHED CAN OPENER, WIRE CUTTER, AND CORKSCREW.
No. 591,459. Patented Oct. 12, 1897.
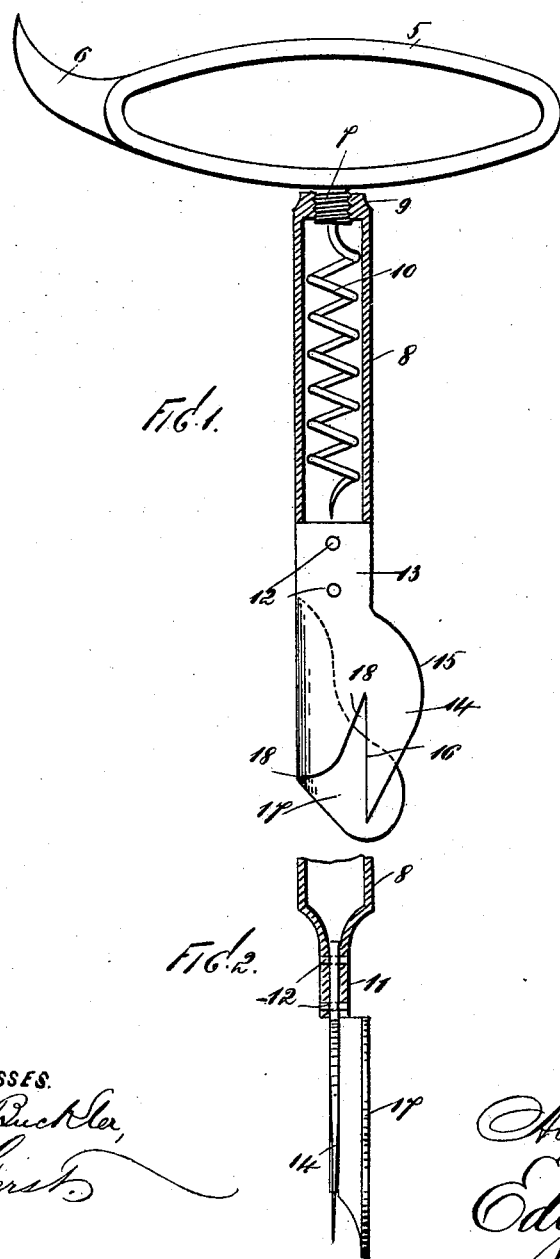
WITNESSES.
John Buckler,
C. Gerst.
INVENTOR
Albert Dell,
BY
Edgar Tate & Co.
ATTORNEYS.

UNITED STATES PATENT OFFICE.

ALBERT DELL, OF DOBBS FERRY, NEW YORK.

ATTACHED CAN-OPENER, WIRE-CUTTER, AND CORKSCREW.

SPECIFICATION forming part of Letters Patent No. 591,459, dated October 12, 1897.

Application filed April 2, 1897. Serial No. 630,385. (No model.)

*To all whom it may concern:*

Be it known that I, ALBERT DELL, a citizen of the United States, residing at Dobbs Ferry, in the county of Westchester and State of New York, have invented certain new and useful Improvements in Attached Can-Openers, Wire-Cutters, and Corkscrews, of which the following is a full and complete specification, such as will enable those skilled in the art to which it appertains to make and use the same.

This invention relates to can-openers, corkscrews, and wire-cutters; and the object thereof is to provide an instrument of this class which is adapted to serve as a combination can-opener, corkscrew, and wire-cutter, a further object being to provide an instrument of the class specified which is simple in construction and operation and which may be used for either of said purposes whenever necessary.

The invention is fully disclosed in the following specification, of which the accompanying drawings form a part, in which—

Figure 1 is a partial sectional side view of my improved combination can-opener, corkscrew, and wire-cutter; and Fig 2, a sectional side view of a part thereof at right angles to the view shown in Fig 1.

In the drawings forming part of this specification the separate parts of my improvement are designated by the same numerals of reference in each of the views, and in the practice of my invention I provide a device of the class herein specified which comprises a handle 5, which is preferably oblong in form and which is provided at one end with a short curved blade or hook 6, which is adapted to serve as a wire-cutter, and the handle 5 is provided at one side with a screw-threaded shank 7, and I also provide a tube 8, which is provided at one end with a thick annular rim or collar 9, which is screw-threaded and by means of which said tube is adapted to be secured to the screw-threaded shank 7 of the handle 5.

The screw-threaded shank 7 of the handle 5 is provided with a corkscrew which is of the usual form and which is adapted to enter the tube 8, and the end of the tube 8 opposite to that which is connected with the handle 5 is flattened, as shown at 11 in Fig. 2, the separate sides of the end of the tube being brought close together, and bolted or secured between said sides by means of rivets or bolts 12 is a plate 13, which is of the same width as the flattened portion of the tube 8, and this plate is projected and provided at one side thereof with a blade 14, which extends in line with the plate 13 and in line with the tube 8, and the back of said blade is curved, as shown at 15, and the inner or cutting edge thereof is preferably straight, as shown at 16, and formed on the opposite side of the plate 13 is a wing or guard 17, which is formed integrally with the projected end of the plate 13 and with the shank of the cutting-blade 14, and between said wing or guard and said cutting-blade is a deep triangular notch or recess 18.

The wing or guard 17 is curved over and parallel with the body portion of the plate 13 and the cutting-blade 14, as clearly shown in the drawings, and the end of said wing or guard projects beyond the point of the blade.

The plate 13 and the blade 14, together with the guard or wing 17, which is formed integrally therewith, constitute the can-opener of the device, and the operation will be readily understood from the foregoing description when taken in connection with the accompanying drawings and the following statement thereof.

In using this device as a can-opener the point of the blade 14 is forced through the head of the can adjacent to the rim thereof, and the wing or guard 17 projects downwardly at the side of the can and holds the blade in proper position relative to the rim of the head of the can, and the edge of the rim of the can fits in the folds of the wing or guard 17 at 18. The blade 14 is then forced around the head of the can and at the same time the handle 5 is raised and lowered, and the head of the can after the blade has been forced therethrough passes into the notch or recess 18 between the blade and the body portion of the plate 13, on which the wing or guard 17 is formed, and by moving the handle up and down and forcing the blade forwardly the said blade may be passed entirely around the can, and in this operation the fold 18 of the wing or guard, against which the flange around the head of the can presses, serves as a fulcrum for the blade. The head of the can may thus be cut entirely or partially out, as may be desired, and whenever it is desired to use this device as a corkscrew the handle is detached from the tube 8, and the device may be used as a wire-cutter without removing the handle from said tube.

This device is simple in construction and operation and is perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. An attached corkscrew and can-opener, consisting of a handle to one side of which is secured a screw-threaded shank, a corkscrew which is secured to said shank, a tube which is detachably connected with said shank and into which said corkscrew passes, said tube being flattened at its outer end, and provided with a plate which is secured thereto, said plate being provided at one side with a blade, and at the opposite side with a wing or guard which is folded over and parallel with said blade, said blade and said wing or guard being separated by a deep triangular notch or recess, and the cutting edge of the blade being adjacent to said notch or recess, substantially as shown and described.

2. An attached corkscrew and can-opener, consisting of a handle to one side of which is secured a screw-threaded shank, a corkscrew which is secured to said shank, a tube which is detachably connected with said shank, and into which said corkscrew passes, said tube being flattened at its outer end, and provided with a plate which is secured thereto, said plate being provided at one side with a blade, and at the opposite side with a wing or guard which is folded over and parallel with said blade, said blade and said wing or guard being separated by a deep triangular notch or recess, and the cutting edge of the blade being adjacent to said notch or recess, and said handle being also provided at one end thereof, with a short curved blade, substantially as shown and described.

In testimony that I claim the foregoing as my invention I have signed my name, in presence of the subscribing witnesses, this 30th day of March, 1897.

ALBERT DELL.

Witnesses:
WILDER S. BUFFEM,
FRANK S. LYNT.